Figure 1:
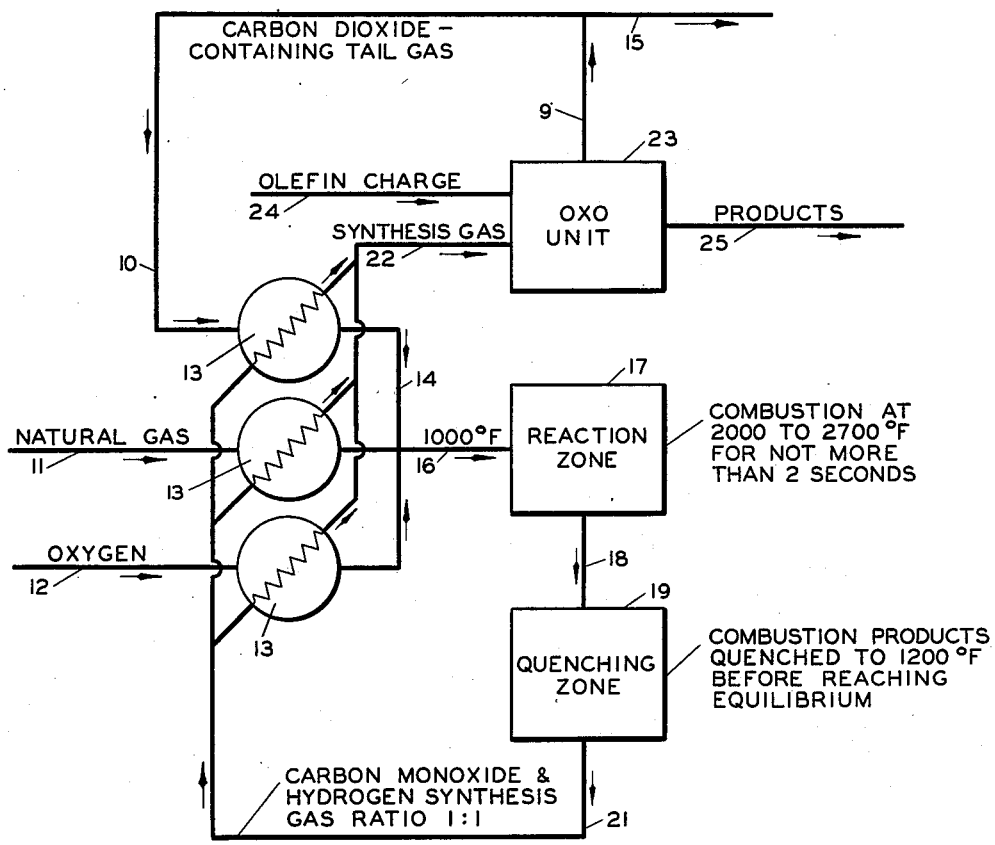

May 12, 1953   B. J. MAYLAND ET AL   2,638,452
PROCESS FOR MAKING SYNTHESIS GAS WITH A 1:1 RATIO $H_2$ TO CO
Filed Oct. 18, 1948

*INVENTORS*
B.J. MAYLAND
S.G. STEWART
BY *Hudson & Young*

ATTORNEYS

Patented May 12, 1953

2,638,452

UNITED STATES PATENT OFFICE 2,638,452

PROCESS FOR MAKING SYNTHESIS GAS WITH A 1:1 RATIO H₂ TO CO

Bertrand J. Mayland and S Grant Stewart, Bartlesville, Okla., assignors to Phillips Petroleum Company, a corporation of Delaware Application October 18, 1948, Serial No. 55,176

13 Claims. (Cl. 252—373)

This invention relates to a process for manufacturing carbon monoxide and hydrogen synthesis gas. In one of its more specific aspects it relates to the production of synthesis gas containing carbon monoxide and hydrogen in a ratio of 1:1.

Most processes for the production of synthesis gas, are concerned with the production of a gas mixture containing carbon monoxide and hydrogen in the ratio of 1:2 which is the optimum ratio for the production of hydrocarbons by Fischer-Tropsch synthesis. There are, however, other processes in which it is desirable to use a synthesis gas having a ratio of carbon monoxide to hydrogen other than 1:2. One such is the Oxo process which is a method for making aldehydes and alcohols by the reaction of olefins with a carbon monoxide and hydrogen synthesis gas of the ratio 1:1 over a Fischer-Tropsch catalyst. This process was developed by the Germans during World War II to augment their supplies of alcohols and aldehydes.

The Oxo process as referred to herein is a process whereby aldehydes and alcohols are manufactured by the addition of carbon monoxide and hydrogen to olefins. Hydrogenation of the aldehyde product gives the primary alcohol. The formation of the aldehyde by the addition of synthesis gas to an olefin is called the Oxo step and is the one of primary interest in this case. This reaction is preferably carried out at temperatures in the range of 200 to 600° F. and pressures in the range of 1000 to 5000 pounds per square inch. Often finely divided Fischer-Tropsch catalyst is used and is suspended in the liquid feed in concentrations in the range of 3 to 5 per cent by weight. One particular catalyst the Germans used with success was comprised of 30% cobalt, 2% thorium oxide, 2% magnesium oxide, and 66% kieselguhr. The product material from the Oxo step may contain as much as 20% aldehyde polymerization products, about ⅓ of the initially formed aldehyde in the form of the corresponding primary alcohol, the remainder being aldehyde.

In the past, it has been the practice in manufacturing carbon monoxide and hydrogen synthesis gas to control the ratio of the constituents by the temperature at which it is manufactured, the ratio at which reactants are charged, and by the specific reactants. Most commonly, synthesis gas of the type referred to herein is manufactured by the partial oxidation of natural gas. When methane, the primary constituent of natural gas, or natural gas is burned with oxygen or an oxygen-containing gas, in sufficient quantities to permit combustion, the products will be carbon monoxide, carbon dioxide, hydrogen and water and under certain conditions, carbon black and unreacted methane or natural gas. If the ratio of oxygen or oxygen-containing gas to natural gas is varied, the equilibrium products, i. e., primarily carbon monoxide and hydrogen, may be effected to give proportions other than that of 1:2 which is the approximate ratio obtained if the natural gas is allowed to burn with only as much oxygen as required for partial oxidation. Paralleling this method of changing the proportion of product materials is the change due to varying the temperature at which the oxidation of the natural gas takes place. By either of these methods the proportions of carbon monoxide to hydrogen may be altered within limits. To be more specific; when one mol of methane is oxidized with one-half mol of oxygen the proportion of carbon monoxide and hydrogen will be in the mol ratio of about 1:2. However, if more than one-half mol of oxygen is supplied the amount of hydrogen will be reduced because some of it will be burned to water; similarly, the amount of carbon monoxide will be reduced because some of it will be burned to carbon dioxide. Now if, with more than one-half mol of oxygen, the oxidation is carried out at 1000° C., the proportion of carbon monoxide to hydrogen will be about 1:2; however, if the oxidation is carried out at only 700° C. the proportion will be about 1:3. These same general results hold true when the methane is in the form of natural gas, which often contains quantities of the other normally gaseous hydrocarbons.

An object of our invention is to produce carbon monoxide and hydrogen synthesis gas in the mol ratio of 1:1.

Another object is to provide an economical process for the manufacture of 1:1 carbon monoxide-hydrogen synthesis gas in high yields.

Another object is to provide an improved process for the manufacture of carbon monoxide and hydrogen synthesis gas in the mol ratio of 1:1 in conjunction with a process for the manufacture of alcohols and aldehydes.

Further objects and advantages of our invention will be apparent to one skilled in the art from the accompanying disclosure and discussion.

A 1:1 mol ratio of carbon monoxide to hydrogen is not readily obtainable by the reaction of methane with carbon dioxide, as shown in Equation 1 below, (1) $CH_4 + CO_2 \rightarrow 2CO + 2H_2$ might suggest; because this reaction is highly endothermic. A process carried out according to this reaction would require very expensive equipment for transfer of heat to the reaction zone and would require further expense to generate the required heat. Therefore, even though a process where carbon dioxide is reacted with methane to produce 1:1 carbon monoxide-hydrogen synthesis gas might appear to be feasible, in actual practice it would be so uneconomical that it would be impracticable to carry out.

In the following discussion and equations methane is used as the hydrocarbon which is oxidized, however, we may also include the use of natural gas whose primary constituent is methane, but which may also contain other light hydrocarbons, such as those which are normally gaseous. Because of the higher carbon to hydrogen ratio in these heavier hydrocarbons, a ratio of hydrogen to carbon monoxide of even less than 1:1 may be obtained.

Our invention utilizes the exothermic partial oxidation reaction of natural gas as shown in the following equations to obtain a synthesis gas containing carbon monoxide and hydrogen in the ratio of 1:1. As usually written the partial oxidation equation is (2) $\quad CH_4 + \tfrac{1}{2}O_2 \rightarrow CO + 2H_2$ By this equation the ratio of carbon monoxide to hydrogen in the synthesis gas is 1:2. However, the partial oxidation reaction is considerably more complex than as represented in the above equation, and for the purpose of this invention must be represented more completely by the following three equations.

(3) $\quad CH_4 + 2O_2 \rightarrow CO_2 + 2H_2O$
(4) $\quad CH_4 + H_2O \rightarrow CO + 3H_2$
(5) $\quad CH_4 + CO_2 \rightarrow 2CO + 2H_2$ These three equations are not the only ones that can be written for the partial oxidation reaction, but they are sufficient to describe the equilibria and heats of reaction involved. The exact mechanism of the reaction is complex, but there is considerable evidence showing that the relative reaction rates are such that in the first part of the reaction the oxygen is used up rapidly by the methane forming carbon dioxide and steam as is shown in Equation 3 above. The remaining unreacted methane then reacts with the carbon dioxide and steam according to Equations 4 and 5, respectively. There is a tendency for the carbon dioxide to react with the remaining methane and the final equilibrium to be established by the water gas shift reaction as shown in Equation 6 below, thus increasing the volume of hydrogen and bring the ratio of carbon monoxide and hydrogen to about 1:2.

(6) $\quad CO + H_2O \rightarrow CO_2 + H_2$

We have discovered that the reactions according to Equations 4 and 5 do not proceed with the same speed and that by control of certain reaction conditions selectivity between these two may be obtained. We have found that the reaction according to Equation 5 is more rapid than that of Equation 4 and that rapid quenching of the products of partial oxidation of methane, before the steam formed by the reaction has time to react with appreciable methane, will produce a synthesis gas containing carbon monoxide and hydrogen in the ratio of 1:1, and that when natural gas is used ratios of hydrogen to carbon monoxide of less than 1:1 may be had. We have found that by quenching the reaction between methane and oxygen rapidly before equilibrium is reached, a product synthesis gas containing carbon monoxide in the ratio of 1:1 or even less is obtained.

In a preferred embodiment of our invention, natural gas, oxygen, and if desired recycle tail gas containing carbon dioxide from an Oxo process or other process having carbon dioxide in the tail gas in appreciable quantities, are passed through heat exchange means in separate streams where they are heated to a temperature up to about 1000° F. A satisfactory mol ratio of natural gas to oxygen, said oxygen being introduced either in the pure state or in air, is 1:1 to 1.5:1; however, the preferred ratio is in the range of 1.2:1 to 1.4:1.

Carbon dioxide introduced to the synthesis gas preparation step in tail gas containing same may be introduced in quantities in the range of 0 to 20 mol per cent of the total charge. However, the volume must be adjusted so that the temperature in the reaction zone is not reduced below a minimum of 2000° F. by the endothermic reaction of carbon dioxide with natural gas.

The preheated materials are then admixed and introduced to a combustion chamber where they are burned at a temperature in the range of 2000 to 2700° F., but preferably in the range of 2300 to 2500° F. and at a pressure in the range of atmospheric to 400 pounds per square inch gauge. After partial combustion the products are rapidly quenched to a temperature of 1200° F. or lower. Contact time, i. e., the time from introduction of the charge materials to the reaction chamber until quenching, is in the range of 0.02 to 2 seconds, and preferably in the range of 0.1 to 1.5 seconds. Both steam and carbon dioxide may, if desired, be introduced along with the natural gas and oxygen to conserve oxygen, and only enough oxygen added to furnish sufficient exothermic heat of reaction to make the process self-sustaining. It is preferable, however, to add more carbon dioxide than steam since steam tends to raise the hydrogen to carbon monoxide ratio. In the actual operation of our process, carbon dioxide appears in the synthesis gas which is passed to a process such as the Oxo process. The carbon dioxide passes through the process unreacted and is thereafter separated from the products and recycled in the tail gas to the synthesis gas manufacturing unit.

Several methods of quenching known to those skilled in the art may be used. For example, a reaction chamber, the upper portion of which is refractory lined and the lower portion of which is jacketed so that water or steam or other suitable coolant may be passed therethrough, is quite satisfactory. The lower end of such a chamber serves as a quench for the hot gases. Another method of quenching is to install cooling coils in the lower portion of the reaction chamber with which the gases come in contact and are cooled. Still other methods of quenching are to pass a cool finely divided solid material through the hot gases thereby taking up sufficient heat to prevent further reaction; or to quench with inert fluids. It is well within the scope of our invention that the reaction zone might be horizontally positioned, thus the end opposite the combustion zone would be a quenching zone. It is also possible to carry out the reaction in the bottom of a vertical reaction chamber and have the quench zone in the top thereof.

A further understanding of some of the many aspects of our invention may be had by referring to the attached schematic flow diagrams in conjunction with the following discussion. Various additional valves, pumps, and other conventional equipment, necessary for the practice of this invention, will be familiar to one skilled in the art and have been omitted from the drawings for the sake of clarity. The description of the drawings provides specific methods of operating our process. It is understood, however, while this is representative in general of our process, various minor changes may be made in adapting the process to the various conditions within the scope of the invention.

Refer now to Figure 1. Carbon dioxide, natural gas, and oxygen are passed through lines 10, 11, and 12, respectively, to heat exchange means 13 where they are heated to an elevated temperature up to about 1000° F. From heat exchange, the hot gases pass through line 14 to line 16 where they become admixed prior to introduction to reaction zone 17. In reaction zone 17 the gases are burned at a temperature in the range of 2000 to 2700° F. for a period of not more than two seconds, and preferably in the range of 0.5 to 1.5 seconds. After partial burning, i. e., before equilibrium is reached, the hot gases are removed from combustion zone 17 via line 18 to quenching zone 19. In this zone, the gases are quenched by any suitable method, and as hereinbefore mentioned, to a temperature of 1200° F. or below to prevent any further reaction. The quenched gases are removed via line 21 and passed to heat exchange means 13 where the charge materials are preheated. From heat exchange, the further cooled gases are removed via line 22 and passed to such a unit as the Oxo unit 23. In this unit, the 1:1 carbon monoxide-hydrogen synthesis gas is reacted with olefins introduced through line 24, in the presence of a Fischer-Tropsch cobalt-thoria-magnesia catalyst, to produce oxygenated compounds of the types such as aldehydes and alcohols. These products are removed via line 25. Carbon dioxide, separated from the Oxo unit product is passed via line 9 to line 10 by which it is passed to reaction zone 17. Excess carbon dioxide is removed via line 15.

Figure 2:
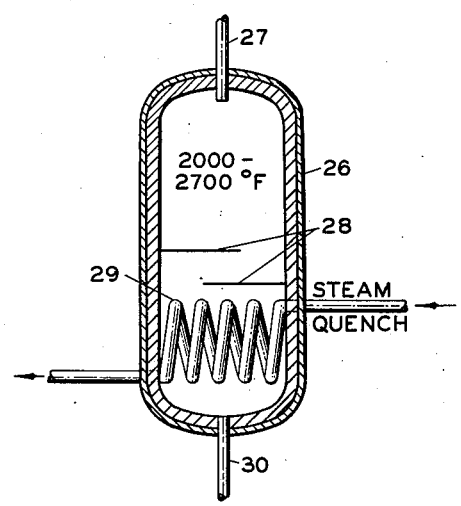

Refer now to Figure 2 which is a diagram of one specific type of reaction chamber which may be used in the practice of our invention. A heated mixture of carbon dioxide, natural gas, and oxygen is introduced via line 27 to refractory lined chamber 26 where it is partially burned. The partially burned gases pass downwardly past baffles 28 and are quenched to a temperature of 1200° F. or lower by contacting steam coils 29 before equilibrium is reached, thus providing carbon monoxide and hydrogen in a ratio of 1:1. The quenched product gases are removed from chamber 26 via line 30 for use as desired.

Advantages of this invention are illustrated by the following examples. The reactants and their proportions, and other specific ingredients are presented as being typical and should not be construed to limit the invention unduly.

Example I

This run was carried out utilizing a reaction chamber wherein the quenching was obtained by contacting the hot partially burned gases with cold walls of the lower portion of the chamber.

The reaction took place at a temperature of about 2500° F. and at atmospheric pressure. Contact time was maintained at approximately one second, and the product was quenched to a temperature of about 1200° F. A shorter contact time than one second might easily have been used if desired as evidenced by the low residual methane in the effluent. A shorter contact time would lower the carbon dioxide content and increase the carbon monoxide content of the effluent gas thus decreasing the hydrogen to carbon monoxide ratio.

Feed:
    Parts by wt. of air/hour_____ 53
    Parts by wt. of oxygen/hour_____ 99
    Parts by wt. of natural gas/hour_____ 80
    Ratio of oxygen to natural gas_____ 1.38
Product:
    $H_2O$ mol per cent_____ 34.9
    $H_2$ mol per cent_____ 19.3
    CO mol per cent_____ 20.1
    $CO_2$ mol per cent_____ 9.2
    $CH_4$ mol per cent_____ 0.4
    $N_2$ mol per cent_____ 15.7
    $O_2$ mol per cent_____ 0.4

Total_____ 100.0
$H_2/CO$_____ 0.96

This example shows that a synthesis gas may be made by our invention wherein the ratio of hydrogen to carbon monoxide is less than one.

Example II

This example is similar to Example I and was carried out under identical process conditions. However, the amount of oxygen was reduced thus raising the volumes of hydrogen and carbon monoxide obtained while reducing the volumes of carbon dioxide and water.

Feed:
    Parts by wt. of air_____ 14
    Parts by wt. of additional oxygen_____ 93
    Parts by wt. of natural gas_____ 80
Product:
    $H_2O$ mol per cent_____ 30.0
    $H_2$ mol per cent_____ 30.2
    CO mol per cent_____ 25.3
    $CO_2$ mol per cent_____ 7.1
    $CH_4$ mol per cent_____ 0.4
    $N_2$ mol per cent_____ 6.0
    $O_2$ mol per cent_____ 1.0

Total_____ 100.0
$H_2/CO$_____ 1.2

In both of the above examples, considerable quantities of carbon dioxide and water were generated by the excess oxygen used. Alternatively, steam and carbon dioxide may be added separately to conserve the oxygen and only enough excess oxygen added to furnish sufficient exothermic heat of reaction to make the process self-sustaining. It is preferable to add more carbon dioxide than steam since the steam will tend to raise the hydrogen to carbon monoxide ratio. Carbon dioxide appears in the tail gas as a by-product along with light hydrocarbon. Recycling of this stream is desirable economically to supply at least a portion of the carbon dioxide and to conserve oxygen.

The above discussion and examples present a simple and economical method for manufacturing carbon monoxide and hydrogen synthesis gas in a ratio of about 1:1 for use in producing oxygenated products such as alcohols, aldehydes, and the like.

Although this process has been described and exemplified in terms of its preferred modifica-

We claim:

1. A process for manufacturing carbon monoxide and hydrogen synthesis gas, which comprises reacting methane with oxygen in a mol ratio of 1:1 to 1.5:1 at a temperature in the range of 2000 to 2700° F. and a contact time in the range of 0.02 to 2 seconds and thereby oxidizing said methane, rapidly quenching reaction products to a temperature of 1200° F. to limit the reaction time within said time range to a value such that appreciable reaction between steam formed by the reaction and methane cannot occur, and recovering carbon monoxide and hydrogen synthesis gas in a mol ratio of about 1:1 as a product of the process.

2. A process for manufacturing carbon monoxide and hydrogen synthesis gas which comprises reacting methane with oxygen in a mol ratio of 1:1 to 1.5:1 at a temperature in the range of 2000 to 2700° F., and thereby oxidizing said methane, quenching reaction products to a temperature of 1200° F. sufficiently rapidly to limit the reaction time to a value in the range of 0.02 to 2 seconds, such that the quenching is completed before appreciable reaction between methane and water formed during the reaction can take place and recovering carbon monoxide and hydrogen synthesis gas in a mol ratio of about 1:1 as a product of the process.

3. A process for manufacturing carbon monoxide and hydrogen synthesis gas, which comprises reacting methane with oxygen in a mol ratio of 1:1 to 1.5:1, and carbon dioxide at a temperature in the range of 2000 to 2700° F., a pressure in the range of atmospheric to 400 pounds per square inch gauge, and a contact time in the range of 0.02 to 2 seconds, rapidly quenching the reaction products to a temperature of about 1200° F. to limit the reaction time within said time range so that appreciable reaction between steam formed by the reaction and methane cannot occur, and recovering carbon monoxide and hydrogen synthesis gas in a mol ratio of about 1:1 as a product of the process.

4. A process for manufacturing carbon monoxide and hydrogen synthesis gas, which comprises admixing methane with oxygen in a mol ratio of 1:1 to 1.5:1 and reacting same at a temperature in the range of 2300 to 2500° F., at a pressure in the range of atmospheric to 400 pounds per square inch gauge and a contact time in the range of 0.1 to 1.5 seconds, rapidly quenching the reaction product to a temperature of about 1200° F. to limit the reaction time within said time range so that appreciable reaction between steam formed by the reaction and methane cannot occur, and recovering carbon monoxide and hydrogen synthesis gas in a mol ratio of about 1:1 as a product of the process.

5. A process according to claim 3 wherein the methane, oxygen, and carbon dioxide are preheated to a temperature of 1000° F. prior to admixing and reacting.

6. A process according to claim 4 wherein the methane is in the form of natural gas.

7. A process for manufacturing carbon monoxide and hydrogen synthesis gas, which comprises preheating methane and oxygen to an elevated temperature, admixing said preheated materials and reacting same at a temperature in the range of 2000 to 2700° F., a pressure in the range of atmospheric to 400 pounds per square inch gauge and a contact time in the range of 0.02 to 2 seconds, the mol ratio of said methane to said oxygen being in the range of 1:1 to 1.5:1, rapidly quenching the reaction product to a temperature of about 1200° F. to limit the reaction time within said time range so that appreciable reaction between steam formed by the reaction and methane cannot occur, and recovering carbon monoxide and hydrogen synthesis gas in a mol ratio of 1:1 as a product of the process.

8. A process according to claim 7 wherein the methane is in the form of natural gas.

9. A process for manufacturing carbon monoxide and hydrogen synthesis gas, which comprises preheating methane and oxygen to a temperature up to 1000° F., admixing said preheated materials and reacting same at a temperature in the range of 2300 to 2500° F., a pressure in the range of atmospheric to 400 pounds per square inch gauge, and a contact time in the range of 0.1 to 1.5 seconds, the mol ratio of said methane to said oxygen being in the range of 1.2:1 to 1.4:1, rapidly quenching the reaction product to a temperature of about 1200° F. to limit the reaction time within said time range so that appreciable reaction between steam formed by the reaction and methane cannot occur, and recovering carbon monoxide and hydrogen synthesis gas in a mol ratio of 1:1 as a product of the process.

10. A process according to claim 9 wherein the methane is in the form of natural gas.

11. A process according to claim 9 wherein carbon dioxide is preheated and admixed with said methane and oxygen and comprises 0 to 20 mol per cent of said preheated materials.

12. A process according to claim 9 wherein carbon dioxide and steam, said carbon dioxide being in excess of said steam, are preheated and admixed with said methane and oxygen.

13. A process according to claim 3 wherein said carbon dioxide is present in an amount in the range of 0 to 20 mol per cent of the total charge.

BERTRAND J. MAYLAND.
S GRANT STEWART.

References Cited in the file of this patent

UNITED STATES PATENTS

| Number | Name | Date |
|---|---|---|
| 1,843,063 | Burke | Jan. 26, 1932 |
| 2,051,363 | Beekley | Aug. 18, 1936 |
| 2,266,989 | Radtke | Dec. 23, 1941 |
| 2,270,897 | Roberts, Jr. | Jan. 27, 1942 |
| 2,327,066 | Roelen | Aug. 17, 1943 |
| 2,532,514 | Phinney | Dec. 5, 1950 |